US012716815B2

(12) United States Patent
Bograd

(10) Patent No.: US 12,716,815 B2
(45) Date of Patent: Aug. 25, 2026

(54) SYSTEMS AND METHODS FOR SURGE MARGIN TESTING OF GAS TURBINE ENGINE USING AN UNDERSIZED LOAD COMPONENT

(71) Applicant: DOOSAN ENERBILITY CO., LTD., Changwon-si (KR)

(72) Inventor: Alexander Bograd, Palm Beach Gardens, FL (US)

(73) Assignee: Doosan Enerbility Co., Ltd., Changwon-si (KR)

( * ) Notice: Subject to any disclaimer, the term of this patent is extended or adjusted under 35 U.S.C. 154(b) by 331 days.

(21) Appl. No.: 18/537,419

(22) Filed: Dec. 12, 2023

(65) Prior Publication Data

US 2025/0189408 A1 Jun. 12, 2025

(51) Int. Cl.

| | |
|---|---|
| ***G01M 15/14*** | (2006.01) |
| ***F02C 9/00*** | (2006.01) |
| ***F02C 9/18*** | (2006.01) |
| ***F02C 9/52*** | (2006.01) |
| ***G01M 15/02*** | (2006.01) |
| ***G01M 99/00*** | (2011.01) |

(52) U.S. Cl.

CPC ............... *G01M 15/14* (2013.01); *F02C 9/00* (2013.01); *F02C 9/18* (2013.01); *F02C 9/52* (2013.01); *G01M 15/02* (2013.01); *G01M 99/007* (2013.01)

(58) Field of Classification Search

CPC .... G01M 15/14; G01M 15/02; G01M 99/007; F02C 9/00; F02C 9/18; F02C 9/52

See application file for complete search history.

(56) References Cited

U.S. PATENT DOCUMENTS

| | | | | |
|---|---|---|---|---|
| 2013/0269310 | A1* | 10/2013 | Wichmann | F02C 3/34 60/726 |
| 2013/0269358 | A1* | 10/2013 | Wichmann | F02C 3/34 60/737 |
| 2025/0188881 | A1* | 6/2025 | Bograd | F02C 9/18 |
| 2025/0223920 | A1* | 7/2025 | Bograd | F02C 3/32 |

FOREIGN PATENT DOCUMENTS

| | | | | |
|---|---|---|---|---|
| JP | 2016142266 A | * | 8/2016 | F02C 9/00 |
| KR | 20240076521 A | * | 5/2024 | F02C 7/26 |
| KR | 20240076523 A | * | 5/2024 | F01D 21/003 |

OTHER PUBLICATIONS

JP-2016142266-A, English Translation (Year: 2016).*
KR-20240076521-A, English Translation (Year: 2024).*
KR-20240076523-A, English Translation (Year: 2024).*

* cited by examiner

*Primary Examiner* — Ryan D Walsh
(74) *Attorney, Agent, or Firm* — Shook, Hardy & Bacon L.L.P.

(57) ABSTRACT

The present disclosure relates to off-grid testing of a gas turbine engine using an undersized load compressor as part of the testing apparatus. By lowering the pressure experienced by the gas turbine engine at its intake and/or exhaust, validation testing can be performed at the gas turbine's maximum combustion temperature and/or maximum cycle pressure ratio without exceeding the power output that the load compressor is able to absorb. Subsequently introducing compressed air from the load compressor into the combustor of the gas turbine engine allows for surge margin testing to be performed.

20 Claims, 6 Drawing Sheets

SYSTEMS AND METHODS FOR SURGE MARGIN TESTING OF GAS TURBINE ENGINE USING AN UNDERSIZED LOAD COMPONENT

TECHNICAL FIELD

The present disclosure relates to systems and methods for off-grid testing of a gas turbine engine, and more particularly, using a system with an undersized load compressor to perform surge margin testing of a gas turbine with a full-speed full-load design power output that is greater than the maximum load of the load compressor.

BACKGROUND

Gas turbine engines used for power generation (e.g., large, land-based gas turbine engines) typically require an extensive set of validation tests to verify that they will perform across a wide variety of operating conditions. Historically, most validation testing occurred after a gas turbine engine was designed, built and installed at a facility and the gas turbine engine was connected to the electric grid (i.e., on-grid testing). This required the outlay of substantial capital before the gas turbine engine was proven to be effective.

SUMMARY

At a high level, systems and methods described herein provide for off-grid validation testing of a gas turbine engine. The system includes a load compressor, an exhaust hood, an intake throttle, and a plurality of fluid conduits. The load compressor is configured to connect with the rotary shaft of the gas turbine engine and may have a maximum load rating that is less than the power generated by the gas turbine engine operating at full speed full load in target operating conditions. The intake throttle is configured to be fluidly connected to the intake of the gas turbine engine for controlling airflow into the gas turbine engine, which thereby controls the pressure of the air at the intake of the gas turbine engine. The exhaust hood may be coupled to the exhaust port of the gas turbine engine for venting exhaust fluid from the gas turbine engine. A first fluid conduit redirects a first portion of the compressed (high-pressure) air generated by the load compressor into the exhaust hood to cause a pressure drop of the exhaust fluid at the downstream end of the gas turbine engine. Together, the components of the system simulate higher altitude operating conditions, which allow for the gas turbine engine to operate across a wider range of operational parameters without exceeding the maximum power that the load compressor can absorb. To conduct surge testing, the system also includes a second fluid conduit that redirects a second portion of the compressed air into the combustor of the gas turbine engine being tested. This allows for testing of the engine within the calculated surge margin of the gas turbine engine without exceeding power or temperature limitations of the gas turbine engine.

BRIEF DESCRIPTION OF THE DRAWINGS

The above and other aspects will become more apparent from the following description of example embodiments with reference to the accompanying drawings, in which.

Figure 1:
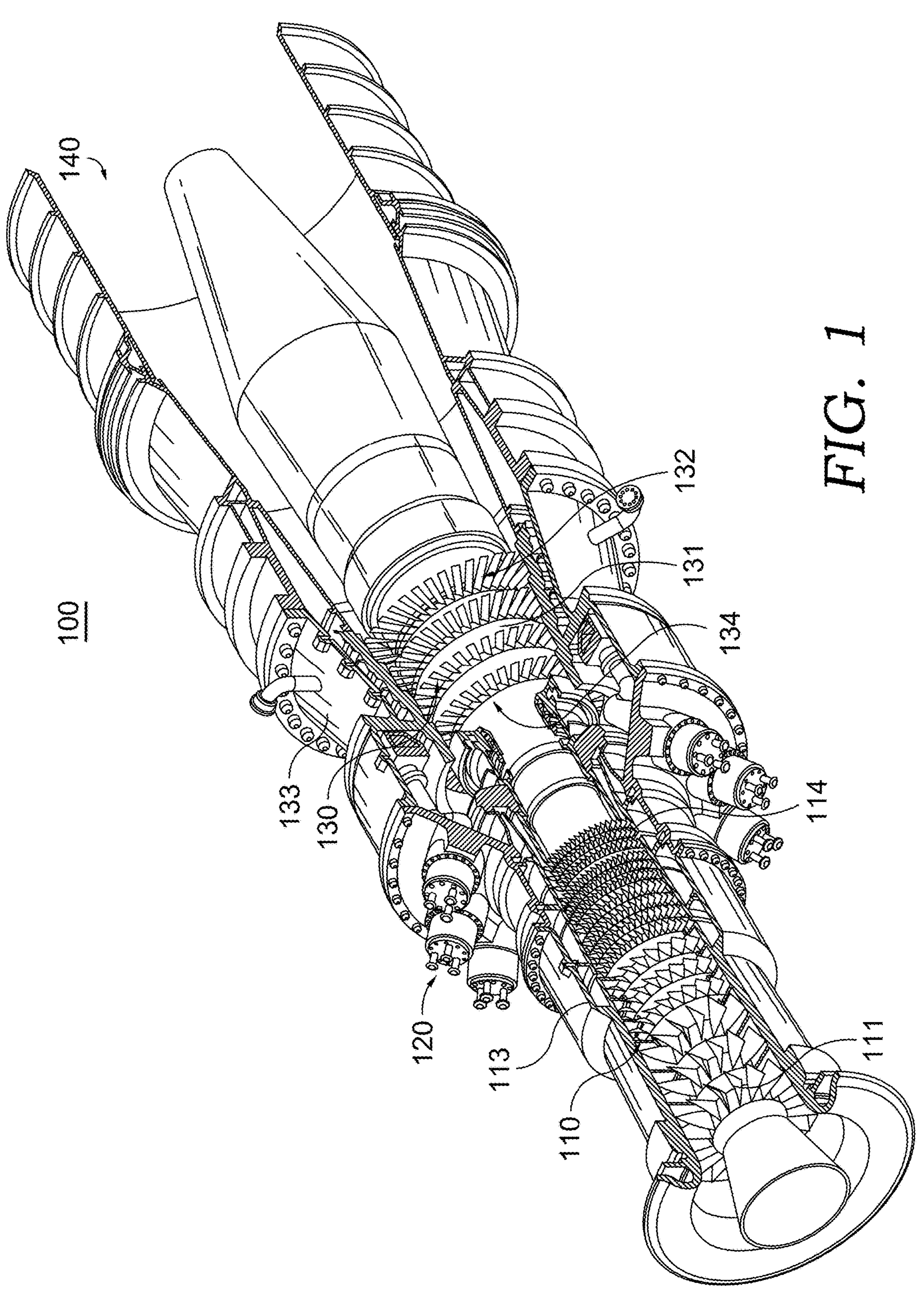
FIG. 1 is a perspective view illustrating an interior of a gas turbine engine according to an aspect described herein.

Examples will be described below in detail with reference to the accompanying drawings. It should be noted that like reference numerals refer to like parts throughout various drawings and examples embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

DETAILED DESCRIPTION

Before being placed in service, gas turbine engines undergo extensive validation testing to provide reasonable assurance that the gas turbine engine will meet expected operating requirements. The validation testing may include operating the gas turbine engine through a variety of operating modes (e.g., start up mode, full speed no load, full speed full load, etc.) as well operating at partial loads and under a wider range of conditions than those that are expected to be experienced in actual operation. Historically, most validation testing occurred after a gas turbine engine was designed, built and installed at a facility. Once the gas turbine engine was installed at a facility it would be connected to the electric grid (i.e., on-grid testing). This required the outlay of substantial capital before the gas turbine engine was proven to be effective. If the gas turbine engine did not pass the validation testing, then it would have to be removed and modified before being reinstalled and retested. This required an additional outlay of substantial capital.

Off-grid testing requires a way to absorb the power generated from the gas turbine engine. One way would be to build a load device (e.g., a specialized compressor rig) that can operate at or above the max power generated by the gas turbine engine. For example, a gas turbine engine that outputs a net power of 100 MW could be coupled to a compressor that is rated to operate at 100 MW or higher. Load compressors of this size, however, are not readily available and very expensive to build, especially if they are going to be used solely for validation testing purposes.

Often new gas turbine engines are built to increase the power generation capacity of a power plant. For example, a new gas turbine engine capable of generating more power may be built to replace an old gas turbine engine with a lower power rating. Instead of building a specialized compressor rig designed for validation testing of the new gas turbine engine, the compressor of the old gas turbine engine can instead be used. In addition to being readily available, such a pre-existing load compressor will have well known performance characteristics. Also, as noted above, a compressor from a large gas turbine engine may require a significant amount of power to drive it, making it a good candidate for this task. However, since the gas turbine engine being tested is typically designed to be capable of generating more power than it takes to run the preexisting load compressor at its maximum load, the gas turbine engine's full range of operation, particularly at the upper ranges of its designed power output, cannot be tested using conventional validation testing set-ups.

In addition, it is desirable as part of a validation testing plan to perform surge testing on the gas turbine engine being validated. Compressor surge (also known as pressure surge) occurs in an engine when compression in the compressor section breaks down, which may result in a reversal of flow so that previously compressed air is expelled out of the engine intake. Compressor surge may occur when the operating cycle pressure ratio exceeds a certain value above a maximum designed cycle pressure ratio. Because these situations happen outside of the normal operating parameters of the gas turbine engine, however, conducting surge testing can be difficult. For example, increasing the cycle pressure ratio of the gas turbine engine may in turn increase the power generated and/or the turbine inlet temperature (TIT) of the gas turbine engine. Increased power may exceed the limit of the load compressor of the validation testing setup, while increasing the TIT may result in exceeding maximum temperature limits of certain components.

The present invention addresses the above problems by simulating operating conditions for the gas turbine engine that limit the amount of power it can generate while allowing other key operating parameters to be maximized, and also altering conditions within the gas turbine engine to induce a compressor surge without exceeding the power limits of the undersized load compressor or the maximum allowable internal temperatures of the gas turbine engine.

First, by redirecting a first portion of the air that is compressed by the load compressor into the downstream flow within an exhaust hood that is attached to the gas turbine engine and restricting the air entering the gas turbine engine intake, the system can simulate higher-altitude conditions that allow the gas turbine engine to operate at higher compression ratio and temperature conditions without exceeding the power limitations of the load compressor.

Second, by redirecting and injecting a second portion of compressed air from the load compressor into the combustor of the gas turbine engine, the system can be used to conduct surge testing of the gas turbine engine. Because the simulation of higher altitude conditions reduces the air pressure downstream of the gas turbine engine, the compressed air of the load compressor is at a higher pressure than the air pressure downstream of the gas turbine compressor. Injecting this compressed air into the combustion chamber of the gas turbine engine operating at a steady state along its operating line both increases the mass of air entering the compressor and increases back pressure experienced by the gas turbine engine's compressor. Because the power generated by the gas turbine engine is a function of the mass flow rate of air, increasing the flow of air into the combustion chamber results in a controlled increase in the power being generated by the gas turbine engine so that it is operating within the surge margin (i.e., above the operating line but below the surge line) so that the engine's ability to operate in the surge margin can be validated.

Surge testing using this method prevents the gas turbine engine from generating excessive power that would overwhelm the undersized load compressor, as well as preventing certain other operating parameters (e.g., maximum inlet temperature of gas entering the turbine) from exceeding certain limits, such as the melting temperature or other thermal limits of certain components.

Referring initially to FIG. 1, a perspective view of the interior of a gas turbine engine 100 according to an example embodiment is depicted. The thermodynamic cycle of the gas turbine engine 100 according to the illustrated embodiment may follow a Brayton cycle. The Brayton cycle may consist of four phases including isentropic compression (adiabatic compression), isobaric heat addition, isentropic expansion (adiabatic expansion), and isobaric heat dissipation. In the Brayton cycle, thermal energy may be released by combustion of fuel in an isobaric environment after atmospheric air is sucked in through an inlet or intake and compressed to a high pressure, hot combustion gas may be expanded to be converted into kinetic energy, and exhaust gas with residual energy may then be discharged to the atmosphere. That is, the Brayton cycle may consist of four processes, i.e., compression, heating, expansion, and exhaust.

The gas turbine engine 100 using the above Brayton cycle may include a compressor 110, a combustor 120, and a turbine 130, as illustrated in FIG. 1. The compressor 110 of the gas turbine engine 100 may suck air from the outside and compress the air. The compressor 110 may supply the combustor 120 with the air compressed by compressor blades 113, and may supply cooling air to a hot region for cooling (e.g., components of the turbine 130). In this case, since the air sucked into the compressor 110 is subject to an adiabatic compression process therein, the pressure and temperature of the air that has passed through the compressor 110 increase.

The compressor 110 may be designed as a centrifugal compressor or an axial compressor. In general, the centrifugal compressor is applied to a small gas turbine engine, whereas the multistage axial compressor is applied to a large gas turbine engine 100 as illustrated in FIG. 1 because it is necessary to compress a large amount of air. In the multistage axial compressor, the compressor blades 113 of the compressor 110 rotate along with the rotation of rotor disks to compress air introduced thereinto while delivering the compressed air to rear-stage compressor vanes 114. The air is compressed increasingly to a high pressure while passing through the compressor blades 113 formed in a multistage manner.

The compressor 110 may be driven by power output from the turbine 130. To this end, a rotary shaft 111 of the compressor 110 may be coupled to a rotary shaft 134 of the turbine 130, as illustrated in FIG. 1. In a large gas turbine engine 100, the compressor 110 may require almost half of the power generated by the turbine 130 for driving.

The combustor 120 may mix the compressed air, which is supplied from the outlet of the compressor 110, with fuel for isobaric combustion to produce combustion gas with high energy. That is, the combustor 120 mixes the compressed air, which is supplied from the outlet of the compressor 110, with fuel for isobaric combustion to produce combustion gas with high energy. The combustor 120 is disposed downstream of the compressor 110 and includes a plurality of burners arranged annularly around a central axis of the gas turbine engine 100.

The turbine 130 includes a plurality of rotor disks 131 mounted on the rotary shaft 134 of the turbine 130, a plurality of turbine blades 132 radially arranged on each of the rotor disks 131, and a plurality of turbine vanes (not shown) positioned axially upstream before each stage of turbine blades 132. Each of the rotor disks 131 has a substantially disk shape and has a plurality of grooves formed on the outer peripheral portion thereof. The grooves are each formed to have a curved surface so that the turbine blades are inserted into the grooves, and the turbine vanes are mounted in a turbine casing 133. The turbine vanes are fixed so as not to rotate and serve to guide the direction of flow of the combustion gas to the next axially downstream stage of the turbine blades 132. The turbine blades 132 generate rotational force while rotating by the combustion gas. The combustion gas exits the gas turbine engine 100 through an exhaust port 140.

In simplified terms, the power (PW) generated by the turbine section of a gas turbine engine is the product of the mass flow rate (W) (mass being air+fuel) times the specific heat ($C_p$) air/fuel mixture times the change in temperature ($\Delta T$) across the turbine stage. That is, $PW=W\times C_p\times\Delta T$. The net power of the gas turbine is the power generated by the turbine section minus the work necessary to run the rest of the engine (e.g., work needed to run the compressor), and losses due to friction, heat loss, etc.

The system, by simulating high-altitude conditions, reduces the amount of air entering the engine, and therefore reduces the total power generated for a set of operating conditions. However, by selectively injecting compressed air into the gas turbine engine's combustor, it can controllably increase the power generated at a set of operating conditions (e.g., a given PR and Nc), which causes it to operate above the operating line and within the surge margin.

Figure 2:
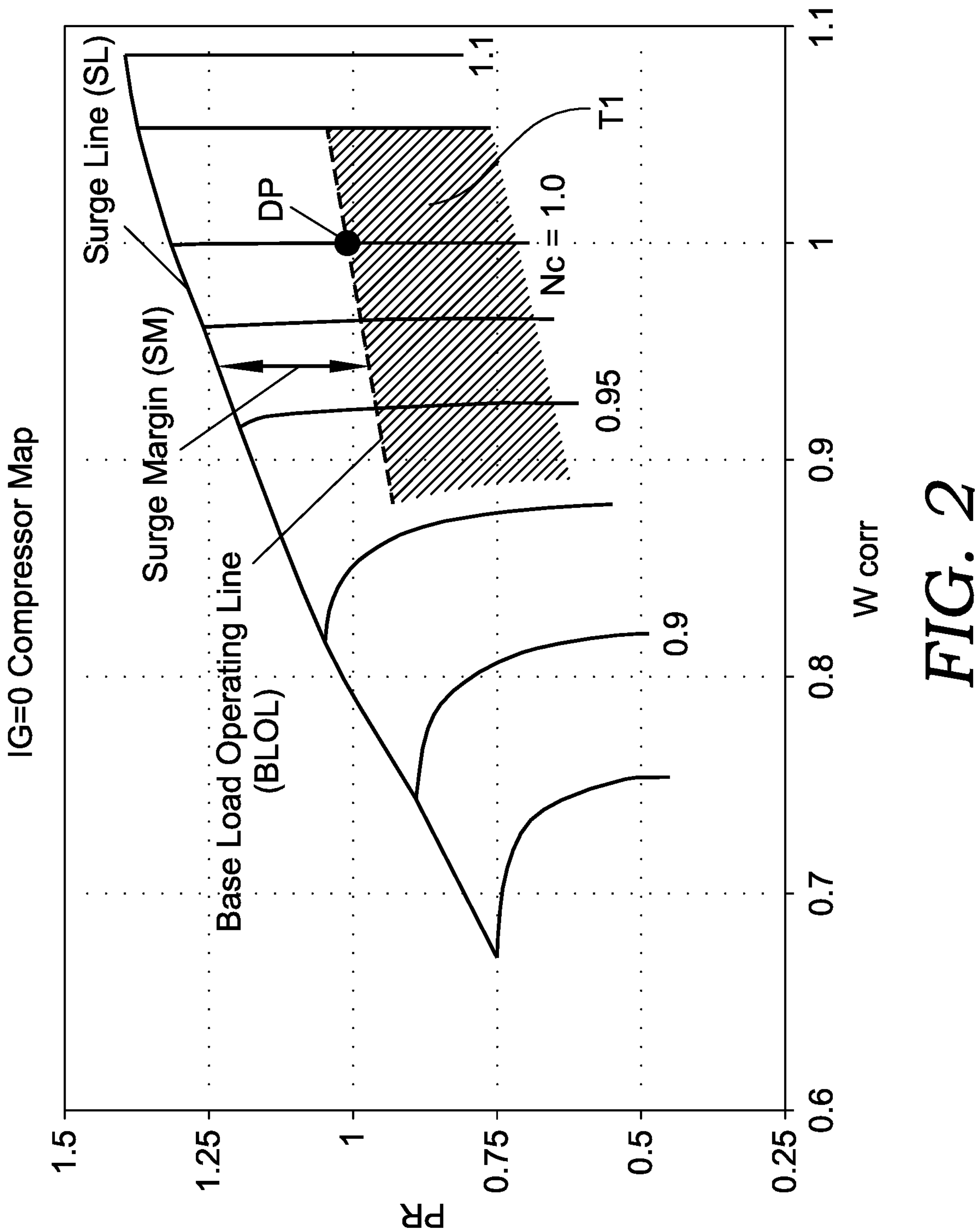
FIG. 2 is a compressor map of a gas turbine engine illustrating a base load operating line for the engine and a corresponding surge line and surge margin.

FIG. 2 is an illustrative depiction of a compressor map for the gas turbine engine. The gas turbine engine's typical steady-state operational envelope Tl is bound along the top line by the base load operating line BLOL. During transient processes, the operating point may for a short time be above the BLOL but below the surge line (SL). The surge line SL identifies the point of increased compressor flow instability where a risk of compressor surge exists. The surge margin SM is the quantitative value of the gap from the BLOL to SL expressed in terms of compression ratio and flow rate Compressor surge can cause significant damage to a gas turbine engine in addition to disrupting the generation of power by the gas turbine engine. It is therefore desirable for a validation testing regime to confirm that operating the engine within the surge margin across a range of operating conditions will not cause a surge. To do so, however, requires a way to reliably increase the amount of power generated for a given set of operating conditions.

Figure 3:
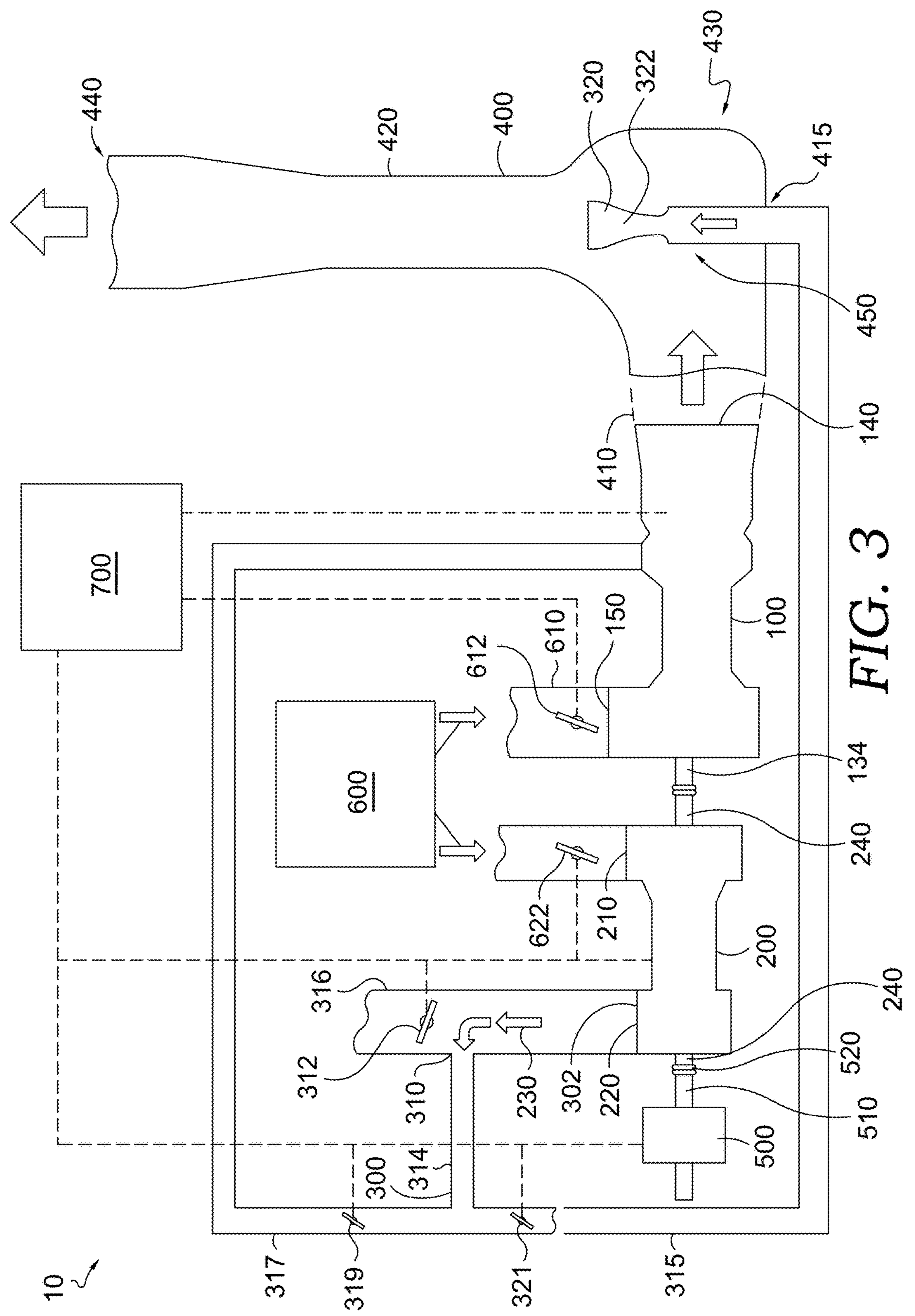
FIG. 3 is a schematic illustration of a system in accordance with an aspect described herein.

Referring now to FIG. 3, a validation testing system 10 is illustrated. The system 10 may include the gas turbine engine 100 to be tested. The gas turbine engine 100 is coupled with a load compressor 200 and connected to an exhaust hood 400. The gas turbine engine 100 includes an intake 150 through which air is introduced into the compressor 110 of the gas turbine engine 100. The intake 150 is connected to and fluidly coupled via an intake duct 610 to an air source 600, which may be a filter house in some aspects. In other aspects, the air source can be the ambient atmosphere. An intake throttle 612 is positioned in the intake duct 610 and upstream from the intake 150 and is configured to regulate the flow of air and the pressure of the air as it flows from the air source 600 into the intake 150. In an example, the intake throttle 612 can be in the form of the gas turbine engine's own inlet guide vanes (IGV); in other examples, the intake throttle 612 can be a separate part of the system 10.

The exhaust hood 400 has a first end 410 that is fluidly coupled with the exhaust port 140 of the gas turbine engine 100. In some aspects, the exhaust hood 400 is directly coupled to the exhaust port 140 such that it abuts or is adjacent to the exhaust port 140. The body 420 of the exhaust hood 400 acts as a channel for the exhaust gas exiting from the turbine section of the gas turbine engine 100 to the second end 440 of the exhaust hood 400, where the exhaust gas can safely exit out into the ambient atmosphere. The body 420 may be configured to be generally straight or have one or more bends 430 depending upon the particulars of the facility in which the system 10 is situated. For example, the exhaust hood 400 may have one bend 430 that redirects the flow of exhaust gas from a horizontal flow generally aligned with the center axis of the gas turbine engine 100 to a vertical flow up and out of the exhaust hood 400.

Continuing to refer to FIG. 3, the rotary shaft 134 of the gas turbine engine 100 is coupled to a rotary shaft 240 of a load compressor 200. In an aspect, the load compressor 200 is a compressor from an existing gas turbine engine. In an aspect, the rotary shaft 134 of the gas turbine engine 100 and the rotary shaft 240 of the load compressor 200 may be directly coupled to each other via a mechanical coupling in a coaxial orientation so that their rotational movements match each other. In an aspect, this coupling is providing with transferring rotational energy from the rotary shaft 134 to the rotary shaft 240 when engine operate above the self-sustain mode. In other aspects, the rotary shaft 134 of the gas turbine engine 100 and the rotary shaft 240 of the load compressor may be coupled via a torque converter, a gearbox, or a combination thereof to starting motor, suitable for transferring rotational energy from the starting motor to the rotary shaft 240 and rotary shaft 240 during start-up.

The load compressor 200 further includes an inlet 210 that is fluidly coupled to a source of air. In an aspect, the air provided to the load compressor 200 may come from the air source 600. An inlet throttle 622 is positioned upstream from the inlet 210 and is configured to regulate the flow of air that is provided from the air source 600 to the inlet 210.

The load compressor 200 also includes an outlet 220, from which pressurized air exits the load compressor 200 when the load compressor is in operation. The outlet 220 is fluidly coupled to a conduit 300. The conduit 300 includes a first end 302 that may be connected to the outlet 220 and a branch point 310 downstream from the first end, at which the conduit 300 splits into a redirect conduit 314 and an exit path 316. Positioned at or adjacent to the branch point 310 is a redirect throttle 312, which can be used to regulate the amount of pressurized air that enters the redirect conduit 314 and the exit path 316 of the conduit 300. The exit path 316 may communicate the pressurized air to an outlet that discharges to the atmosphere.

The redirect conduit 314 in turn branches into an exhaust hood path 315 and a combustor path 317. The exhaust hood path 315 is routed to an entry point 415 in the body 420 of the exhaust hood 400 where it enters the exhaust hood cavity 450 of the exhaust hood 400 at a point downstream from the gas turbine engine exhaust port 140. A second conduit is thus established that connects the exhaust port of the load compressor (outlet 220) with the exhaust hood 400. An exhaust hood path throttle 321 is configured to control the amount of air that enters the exhaust hood path 315 from the redirect conduit 314. The second end 320 of the exhaust hood path 315 is positioned within the exhaust hood 400 at a point downstream from the gas turbine engine 100 exhaust port 140. The second end 320 of the exhaust hood path 315 may include a nozzle 322, which may be configured to affect the characteristics of the flow of the pressurized air exiting the second end 320. In an aspect, the nozzle 322 may be configured to increase the velocity of the compressed air 230 as it exits the nozzle 322. In an aspect, the nozzle 322 is oriented so that the compressed air exiting it is generally aligned with the downstream direction of the exhaust gas as it flows through the body 420 of the exhaust hood 400 at that position within the exhaust hood cavity 450. For example, the nozzle 322 may be oriented to emit the pressurized air from the load compressor 200 in a vertical direction into the exhaust hood 400 stack.

The combustor path 317 is connected to the combustor 120 of the gas turbine engine 100 being tested. A first conduit is thus established connecting the exhaust port of the load compressor (outlet 220) with the combustor 120 of the gas turbine engine 100. A combustor path throttle 319 is configured to control the flow of air flowing into the combustor path 317 from redirect conduit 314. The combustor path 317 thus provides a conduit for a portion of the compressed air from the load compressor 200 to be routed into the combustor 120 of the gas turbine engine 100.

The system 10 may further include an electric starter motor 500 that has a starter rotary shaft 510 that is mechanically coupled to the load compressor rotary shaft 240 or the rotary shaft 134 via a releasable coupling 520. In an aspect, a torque converter, a gearbox, or a combination thereof may also be used to couple the starter rotary shaft 510 to the load compressor rotary shaft 240 in any manner suitable for the purpose and known in the art. The electric starter motor 500 may be used to start the rotation of the rotary shafts (and connected components) of the gas turbine engine and load compressor until the gas turbine engine reaches a high enough rotary speed to sustain operation of the gas turbine engine and load compressor on its own.

In aspects where the load compressor 200 comes from existing engine, the performance characteristics of the load compressor 200 will be well known. Alternatively, the load compressor 200 may be a compressor rig or component that is developed specifically for use in the system 10. In an aspect, the full speed-full load (FSFL) base load design power output of the gas turbine engine is above the maximum driving power of the load compressor. In an aspect, the maximum load of the load compressor 200 is between 50% and 85% of the FSFL design power output of the gas turbine engine 100. In another aspect, the maximum load of the load compressor 200 is between 70% and 75% of the FSFL design power output of the gas turbine engine 100.

The system 10 further includes a control system 700 that is communicatively coupled to and able to control the different system components, including but not limited to the controls of the gas turbine engine 100 (e.g., the fuel injector controls), the load compressor 200, the throttles 612, 622, 312, and electric starter motor 500. In an aspect, the control system 700 may include a processor and a memory, with the processor being capable of executing instructions stored in the memory. In an aspect, the control system 700 may also be communicatively coupled to one or more sensors (not shown) on or proximate to the system 10 that measure different operating parameters of one or more system components, the air flow, and/or the local surroundings, such as pressure, temperature, airspeed, flow rate, rotational speed, etc.

In operation, the intake throttle 612 and the pressurized air communicated to the exhaust hood 400 through the exhaust hood path 315 are used to adjust the volume and pressure of the airflows coming into and out of the gas turbine engine 100. Adjusting the volume and/or pressure in this way simulates operating conditions that the gas turbine engine 100 would experience at higher altitudes. For example, using the bypass throttle 312 to introduce compressed air 230 from the load compressor outlet 220 into the conduit 300 and then through nozzle 322 will cause a pressure drop within the exhaust hood 400 that results in a reduced pressure at the gas turbine engine exhaust port 140. The injection of the compressed gas from the nozzle 322 at a higher pressure has the effect of reducing the pressure of the exhaust gas coming out of the exhaust port 140 of the gas turbine engine 100 to below the ambient pressure.

Simultaneously using the intake throttle 612 to simulate conditions a higher altitude by reducing the airflow from the air source 600 into the intake duct 610 results in a reduced airflow mass entering the gas turbine engine and a reduced pressure at air intake 150. This reduced airflow allows for higher cycle pressure ratios to be tested in the compressor section of the gas turbine engine 100 while generating a lower power output. Adjusting these parameters allows for testing the gas turbine engine 100 across important parts of its operating envelope without exceeding the maximum load of the load compressor 200.

Additionally, using the redirect conduit 314 and combustor path 317 to selectively introduce compressed air from the load compressor 200 into the combustor 120 of the gas turbine engine 100, serves to increase the mass flow of air and fuel into the combustor, which has the effect of increasing the power generated by the gas turbine engine 100 at that particular operating state and provides a capability for a validation testing process that tests the parameters of the surge line and accompanying surge margin.

In the example shown in FIG. 3, the combustor path 317 and the exhaust hood path 315 branch from the same point off the redirect conduit 314. One of skill in the art will readily appreciate that different configurations of the combustor path 317, the exhaust hood path 315 and the redirect conduit 314, and their corresponding throttles are also within the scope of the present disclosure. For example, each path 315, 317 may split off from the conduit 300 separately in some aspects.

Figure 4:
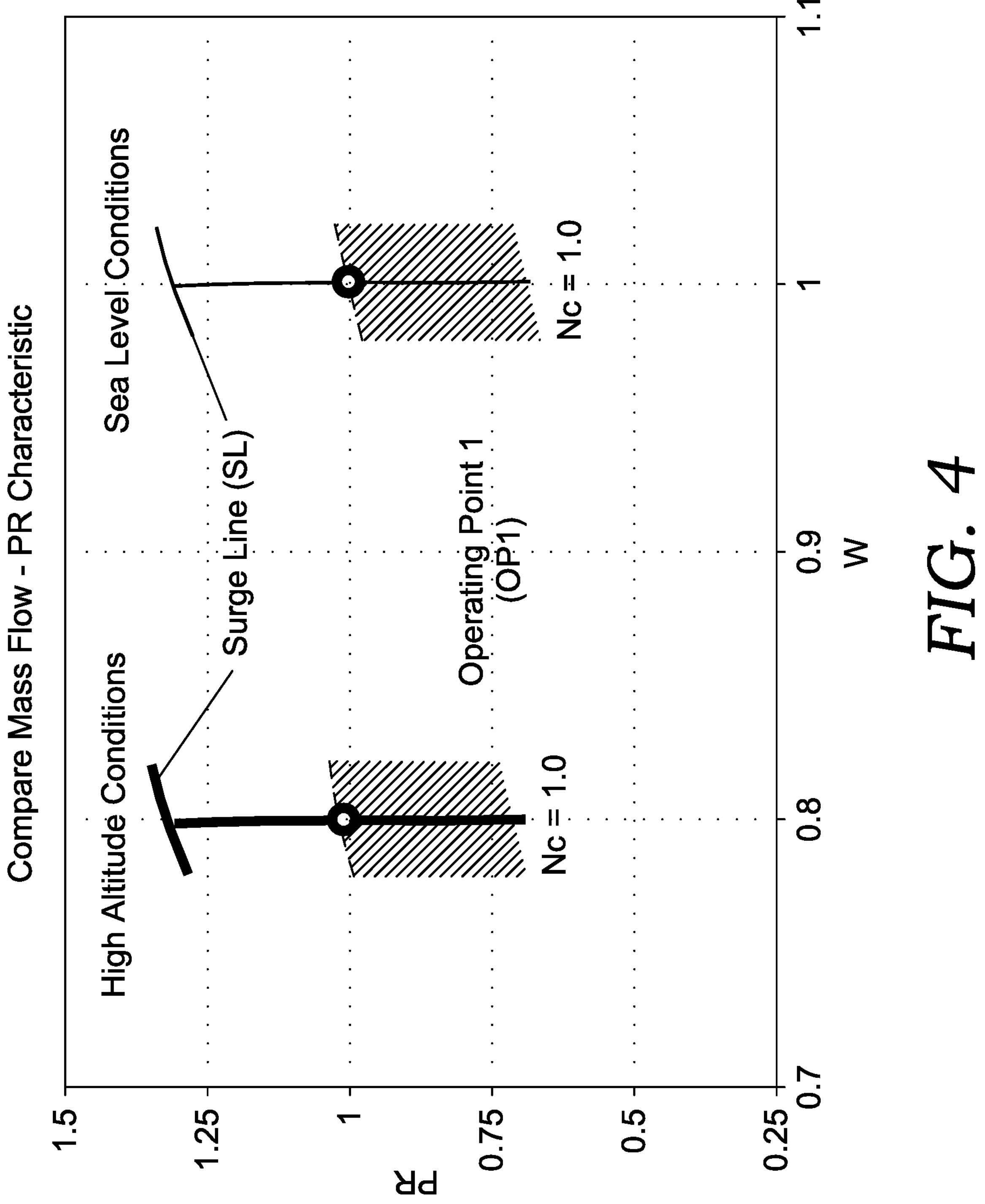
FIG. 4 is a comparative compressor map of the gas turbine engine of FIG. 2 when the system is being used to simulate a high-altitude operating condition.

FIG. 4 is an illustration of a compressor map that illustrates the difference when the gas turbine engine with a compressor map of FIG. 2 operates under the simulated high-altitude conditions enabled by the system 10. A comparison between the same speed line of compressor map (Nc=1) in sea-level and high altitude conditions shows that the same operating parameters of PR, Nc, etc., result in significantly reduced flow rate $W_{corr}$ and therefore power. Surge testing by introducing compressed air into the combustor of the gas turbine engine 100, therefore, while generating additional power, stays within the maximum load that can be absorbed by the system's load compressor 200.

Figure 5:
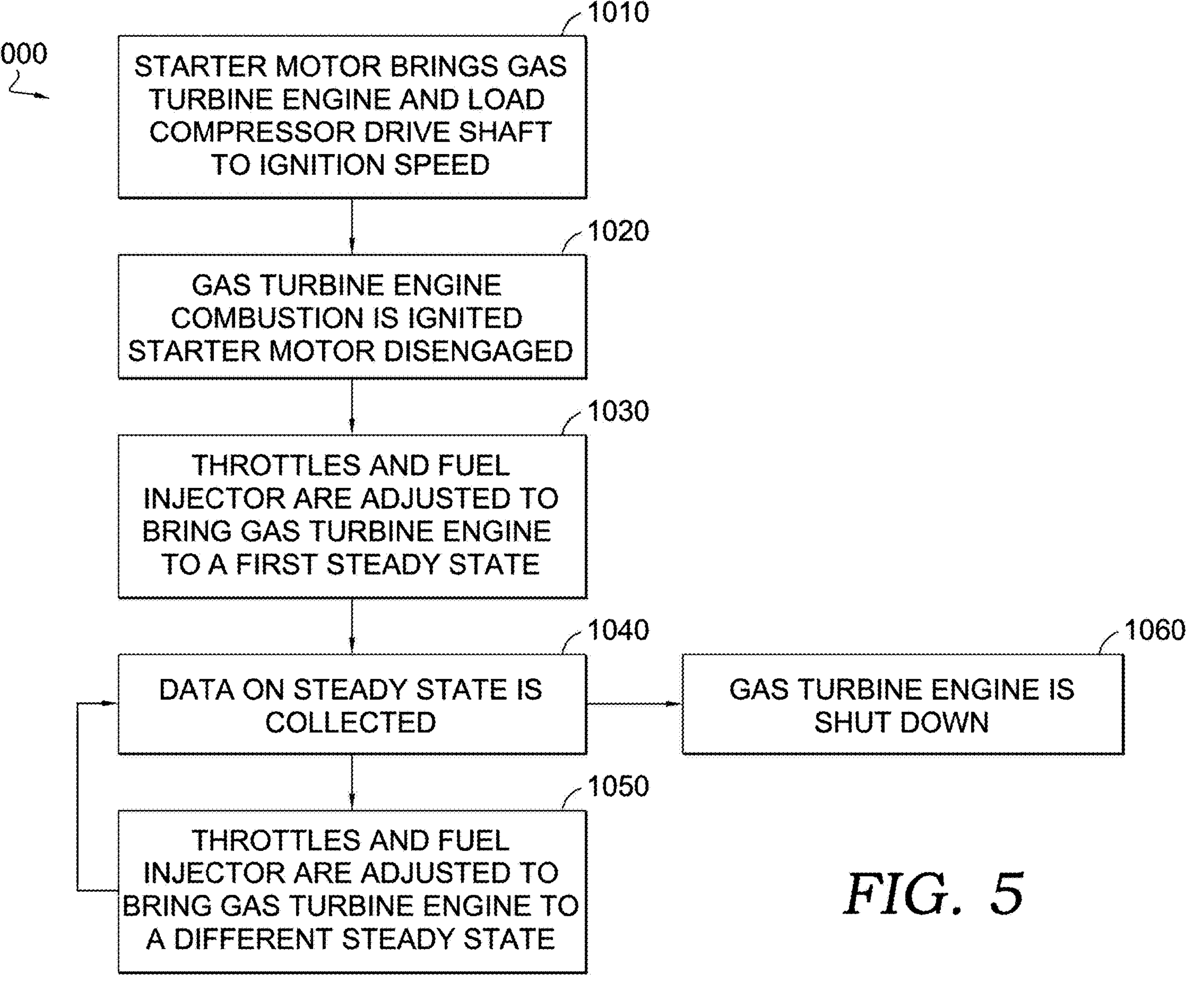
FIG. 5 is a flow chart of a method of validation testing in accordance with an aspect described herein.

With reference to FIG. 5 a validation testing method 1000 is herein described. In step 1010 a starter motor (e.g., electric starter motor 500) is used to drive a rotary shaft of a gas turbine engine (e.g., gas turbine engine 100) and a load compressor (e.g., load compressor 200) to a speed where airflow is sufficient to allow the combustor to be ignited. In step 1020, combustion is initiated and the gas turbine engine increases the rotational speed of the rotary shaft until self-sustaining operational speed is reached, after which the starter motor is disengaged from the rotary shaft. Further, the gas turbine engine is ramped up to FSNL operating condition. In step 1030 a control system (e.g., control system 700) is then used to adjust one or more operational settings of the system and/or the gas turbine engine so that a first steady state operation of the gas turbine engine is achieved (e.g., ramping up the gas turbine engine from FSNL to a partial load point for testing). The operational settings that may be adjusted include the settings of the system components, such as the gas turbine engine air intake throttle (e.g., intake throttle 612), the load compressor inlet throttle (e.g., inlet throttle 622), the redirect throttle (e.g., redirect throttle) 312, and the nozzle (e.g., nozzle 322), and/or the gas turbine engine, such as the angle of the gas turbine inlet vanes or the amount of fuel being injected into the gas turbine engine combustor, among other operational settings. In step 1040 data is then collected on one or more parameters or performance characteristics of the gas turbine engine. In step 1050 the operational settings of the system and/or gas turbine engine are then adjusted to bring the gas turbine engine to a second steady state operation. The step of collecting data 1040 is then repeated, and steps 1040 and 1050 may be repeated for additional points of steady state operation for the gas turbine engine until the desired amount of testing is complete.

In examples, the control system is configured so that an operator can fix a first set of one or more variables (e.g., air inlet pressure) while being able to adjust one or more of a second set of variables (e.g., amount of fuel being injected), with the control system being able to automatically adjust certain controls accordingly to achieve the desired steady state. In examples, the control system can be programmed with a predetermined testing cycle so that data can be collected across a range of operating conditions as desired.

Figure 6:
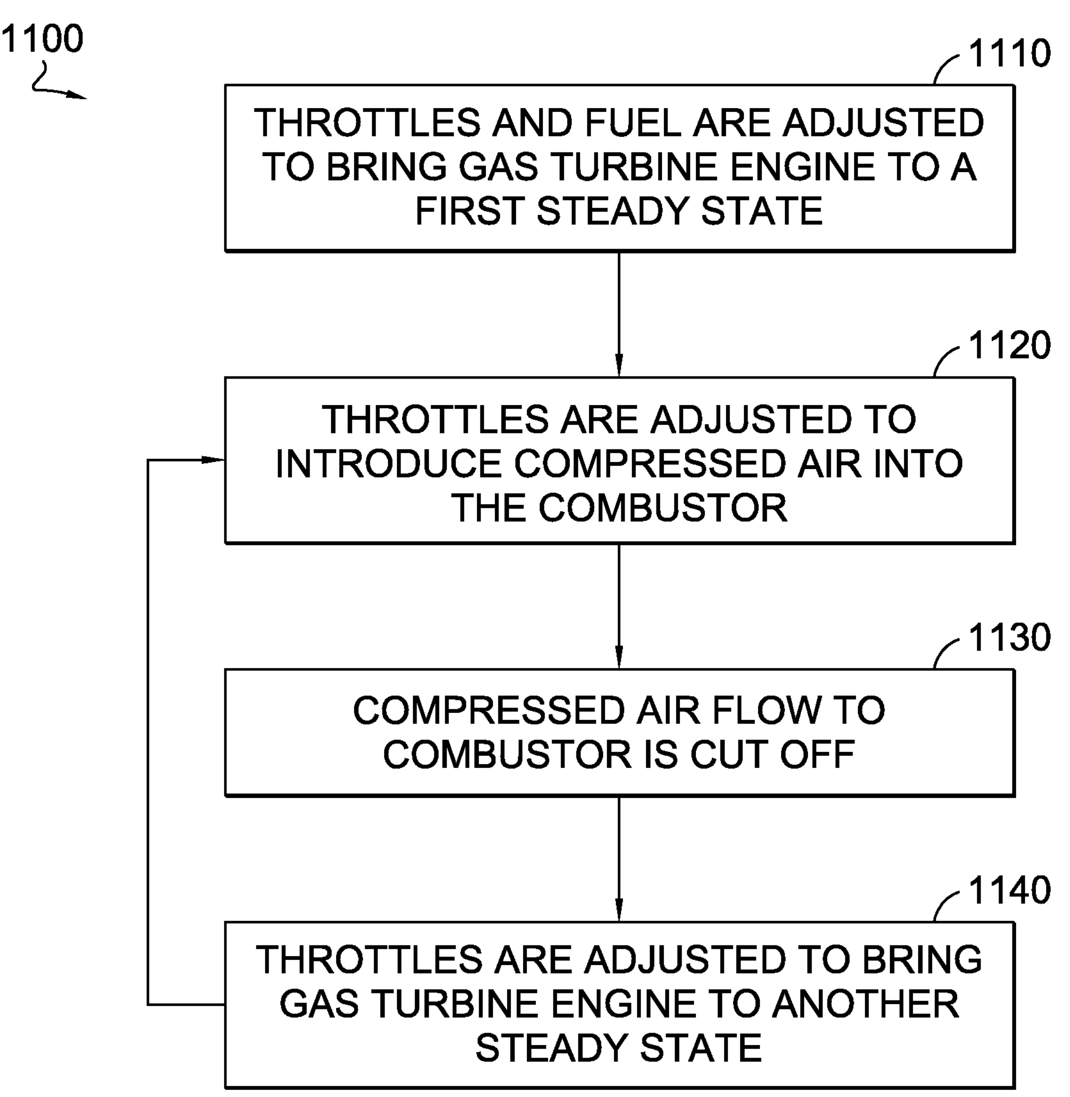
FIG. 6 is a flow chart of a method of surge testing in accordance with an aspect described herein.

A surge testing method 1100 is shown in FIG. 6. To conduct surge testing (either after or during validation testing of the gas turbine engine's normal operating envelope), in step 1110 the gas turbine engine is first brought to a steady state operation at a point along its operating line at certain speed (Nc=1 as example) (e.g., operating point 1 OP1 of FIG. 4). Then, in step 1120 the redirect throttle (e.g., redirect throttle 312) and the combustor throttle (e.g., combustor throttle 319) are adjusted so that compressed air from the load compressor (e.g., load compressor 200) is introduced into the gas turbine engine combustor (e.g., combustor 120) through the system's redirect conduit (e.g., redirect conduit 314) and combustor path (e.g., combustor path 317) until a surge is likely, imminent, and/or experienced, establishing the surge line for that particular point above the operating point OP1. In step 1130, the compressed air to the combustor is cut off and the gas turbine engine allowed to reestablish a steady state operation. In step 1140, the system can then be adjusted until the gas turbine engine establishes a second steady state at a second speed line along the operating line. Step 1120 can then be repeated, with compressed air again being introduced into the combustor of the gas turbine engine until another compressor surge, or near surge, is induced, allowing a second point of the surge line above this second point of the operating line to be identified. In this way, steps 1120 to 1140 can be repeated until the surge line (and the corresponding surge margin) is established along the desired range of operating parameters.

As discussed above, compressor surge may be tested until actual surge occurs or, to prevent potential damage to the gas turbine engine, can be tested to a predetermined point above the operating line to validate that surge does not occur below that point. In this way the surge margin can be validated without subjecting the gas turbine engine to repeated compressor surges.

In an example, the first portion of compressed air that is directed into the exhaust hood is less than 50% of the total air flow through the load compressor, with the pressure reduction at the outlet being on the order of about 30%. In this example, a second portion of the airflow approximating about 20% of the total air flow, through the load compressor is sufficient to increase the cycle pressure ratio of the gas turbine engine to perform a surge check.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

While one or more examples have been described with reference to the accompanying drawings, it will be apparent to those skilled in the art that variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A system for off-grid testing of a gas turbine engine with an undersized load compressor, the system comprising:
- the gas turbine engine comprising an intake, a compressor, a combustor, a turbine, and a rotary shaft;
- a load compressor mechanically coupled to the rotary shaft of the gas turbine engine, the load compressor having an exhaust port;
- a first conduit fluidly connecting the exhaust port of the load compressor with the combustor of the gas turbine engine;
- an exhaust hood fluidly connected to the gas turbine engine downstream of the turbine such that the exhaust emitted from the turbine is discharged into the exhaust hood; and
- a second conduit fluidly connecting the exhaust port of the load compressor with the exhaust hood.

2. The system of claim 1 further comprising a first throttle fluidly connected to the first conduit and configured to limit a first portion of a flow of compressed air from the load compressor into the first conduit.

3. The system of claim 2, wherein the gas turbine engine is capable of attaining a Full-Speed-Full-Load (FSFL) design power output and the load compressor has a maximum load less than the FSFL design power output.

4. The system of claim 3 further comprising a second throttle fluidly connected to the second conduit and configured to limit a second portion of the flow of compressed air from the load compressor into the second conduit.

5. The system of claim 4 further comprising a third throttle fluidly connected to the intake of the gas turbine engine and configured to limit a flow of intake air into the intake.

6. The system of claim 5 further comprising a control system configured for operating the gas turbine engine, the load compressor, the first throttle, the second throttle, and the third throttle.

7. The system of claim 6, wherein the control system includes a processor and a memory capable of storing a set of operating instructions.

8. The system of claim 7 further comprising at least one sensor in communication with the processor and configured to measure at least one parameter of the gas turbine engine.

9. The system of claim 8, wherein the processor is capable of instructing adjustment of at least one operating parameter of the system based on input received from the at least one sensor, in accordance with the set of operating instructions.

10. The system of claim 1 further comprising a starter motor mechanically coupled to the rotary shaft of the gas turbine engine.

11. A method of off-grid testing a gas turbine engine with an undersized load compressor, the method comprising:

mechanically coupling a rotary shaft of the gas turbine engine with a rotary shaft of the undersized load compressor, wherein the gas turbine engine has a full-speed full-load ("FSFL") design power output and the undersized load compressor has a maximum load smaller than the FSFL design power output of the gas turbine engine;

simulating an operating condition for the gas turbine engine using a first portion of a total flow of high-pressure air generated by the undersized load compressor;

inducing the gas turbine engine to operate beyond a design operating state and approach a compressor surge operating state; and generating test data based on the gas turbine engine operating beyond the design operating state.

12. The method of claim 11, wherein simulating the operating condition comprises:

establishing a first pressure within an exhaust hood fluidly connected downstream of the gas turbine engine that is less than an ambient air pressure by introducing the first portion of the total flow of high-pressure air into the exhaust hood; and establishing an air intake pressure at an air intake of the gas turbine engine that matches the first pressure.

13. The method of claim 12, wherein inducing comprises introducing of a second portion of the total flow of high-pressure air generated by the undersized load compressor into a combustor of the gas turbine engine.

14. The method of claim 13, wherein the second portion is between about 15% and about 25% of the total flow of high-pressure air generated by the undersized load compressor.

15. The method of claim 14, wherein the first portion is less than about 50% of the total flow of high-pressure air generated by the undersized load compressor.

16. The method of claim 13 further comprising:

ceasing introducing of a second portion of the total flow of high-pressure air generated by the undersized load compressor into the combustor;

reestablishing the design operating state;

establishing a second design operating state; and inducing the gas turbine engine to operate beyond the second design operating state and approach a second compressor surge operating state.

17. The method of claim 11, wherein the maximum load of the undersized load compressor is between 70% and 75% of the FSFL design power output of the gas turbine engine.

18. The method of claim 11, undersized load compressor is between 50% and 85% of the FSFL design power output of the gas turbine engine.

19. A system for off-grid testing of a gas turbine engine having a full-speed full-load ("FSFL") design power output, the gas turbine engine comprising a compressor having an air intake, a combustor, a turbine, and a rotary shaft coupling the turbine to the compressor, the system comprising:

a load compressor having a maximum load smaller than the FSFL design power output of the gas turbine engine, the load compressor configured to be mechanically coupled to the rotary shaft of the gas turbine engine, the load compressor having an exhaust port;

an intake throttle fluidly connected to the air intake of the gas turbine engine, the intake throttle configured to reduce the pressure of air entering the air intake;

an exhaust hood configured to couple with the gas turbine engine downstream of the turbine such that exhaust gas is communicated from the turbine into the exhaust hood;

an injection nozzle in fluid communication with the exhaust hood;

a first conduit fluidly connecting the exhaust port of the load compressor with the combustor of the gas turbine engine; and a second conduit fluidly connecting the exhaust port of the load compressor with the injection nozzle for communicating high-pressure fluid to the exhaust hood.

20. The system of claim 19 further comprising a first throttle configured to regulate the flow of fluid through the first conduit and a second throttle configured to regulate the flow of fluid through the second conduit.

* * * * *